March 26, 1940.  P. H. BROWN ET AL  2,194,587

TEMPERATURE CONTROL FOR ELECTRIC STOVES

Filed Sept. 14, 1939  3 Sheets-Sheet 1

Inventors
P. H. Brown and
R. M. Carson.
By Thorpe & Thorpe
Attorneys

March 26, 1940.                P. H. BROWN ET AL                2,194,587
TEMPERATURE CONTROL FOR ELECTRIC STOVES
Filed Sept. 14, 1939            3 Sheets-Sheet 2
*Fig. 5.*
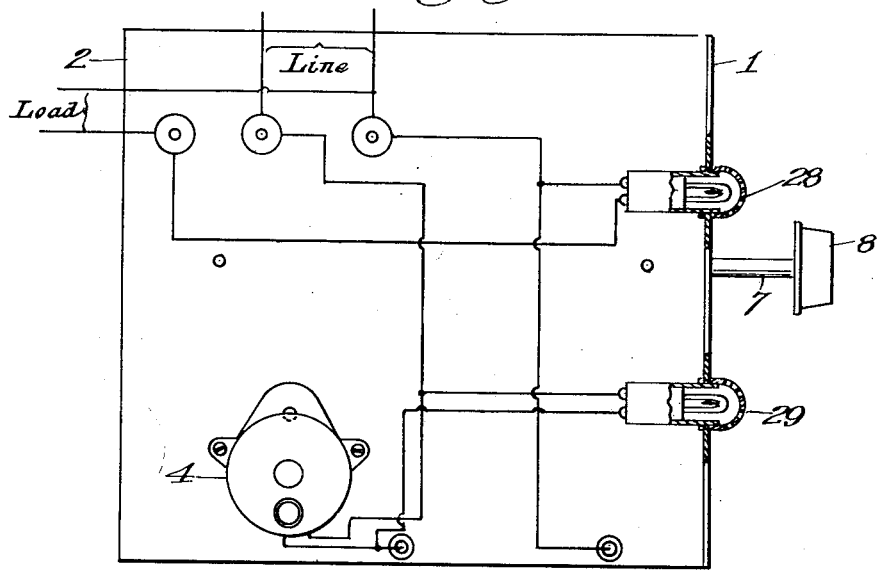
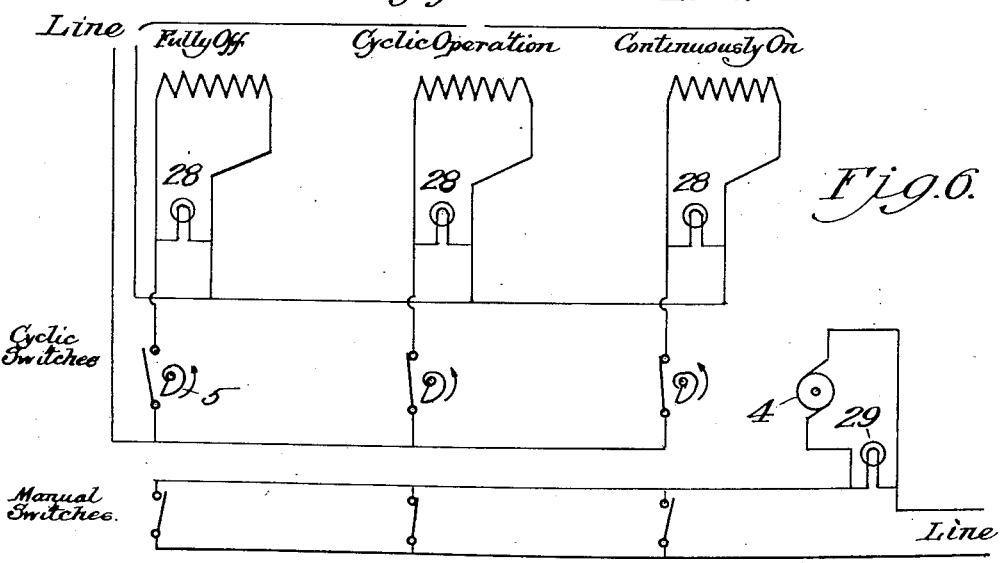
*Fig. 6.*
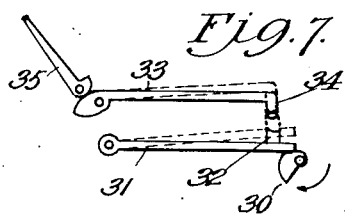
*Fig. 7.*
Inventors
P. H. Brown and
R. M. Carson,
By Thorpe & Thorpe
Attorneys.

March 26, 1940.  P. H. BROWN ET AL  2,194,587
TEMPERATURE CONTROL FOR ELECTRIC STOVES
Filed Sept. 14, 1939    3 Sheets-Sheet 3
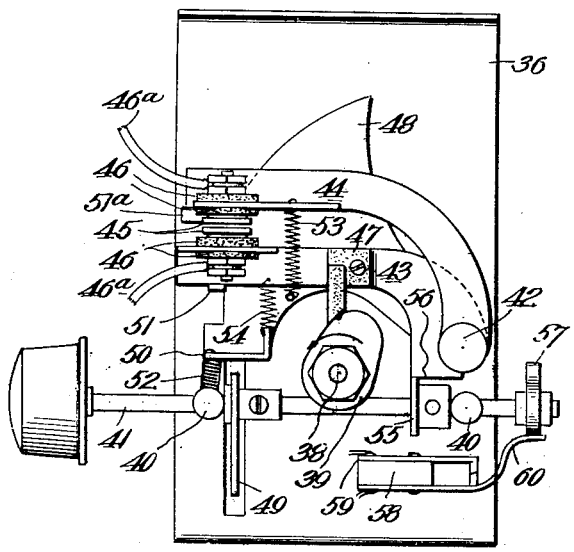
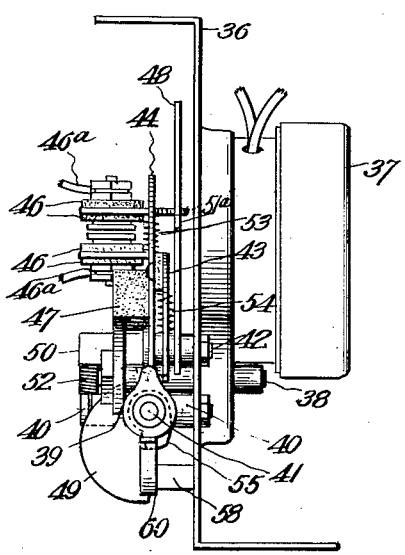
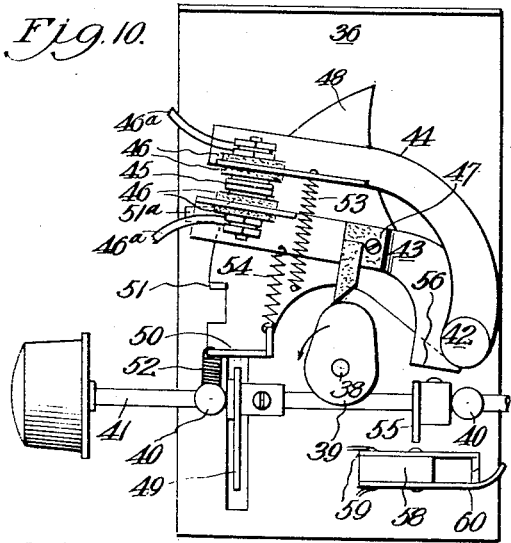
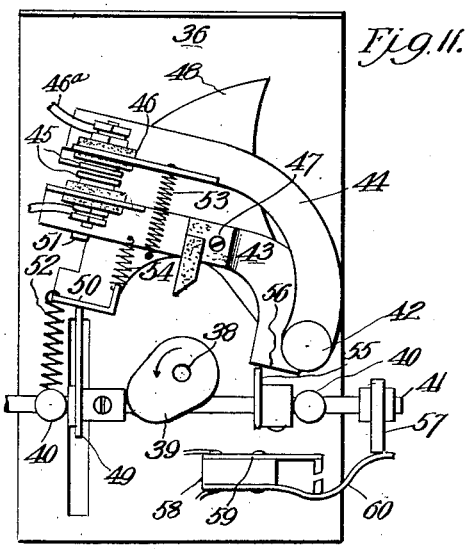
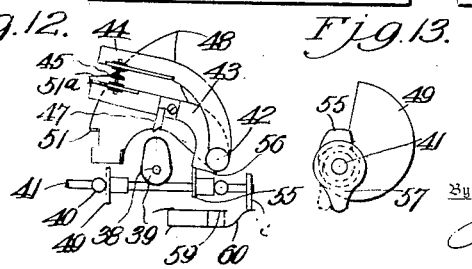
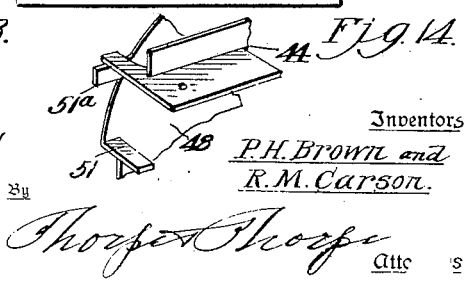
Inventors
P. H. Brown and
R. M. Carson.
By Thorpe & Thorpe
Attorneys Patented Mar. 26, 1940

2,194,587

UNITED STATES PATENT OFFICE 2,194,587

TEMPERATURE CONTROL FOR ELECTRIC STOVES

Paul H. Brown, Kansas City, and Russell M. Carson, Clayton, Mo.; said Carson assignor to said Brown Application September 14, 1939, Serial No. 294,866

7 Claims. (Cl. 219—20)

This invention relates to heat control mechanism to regulate the B. t. u. output within a given time of an electric heating element through the control of watt hours input to such heating element. Where the energizing current is D. C. it is preferred to use mercury or similar enclosed switches, but when A. C. is used, although it may be controlled by an enclosed switch of the mercury type if desired, one object of the invention is to provide the switch with contact points arranged to recede at slow speed on the opening of the control circuit so that the arc is minimized by taking advantage of the zero potential or lower than R. M. S. value as will hereinafter particularly appear. This application is a continuation in part of our application for patent for Timing control mechanism, filed September 24, 1937, Serial No. 165,505.

The invention will be found of particular value in controlling the energization and deenergization of heating elements of any kind, such as, for example, those of electric cooking stoves, whereby the operation of the heating element can be exactly controlled to develop the desired heat output within a predetermined time, it being apparent that the control of watt hours input directly regulates the B. t. u. output of the element. Heretofore, it has been customary to provide open top electric stoves with surface units or hot plates having a plurality of coils to produce a series of stepped heat ranges, there being no control for temperatures intermediate the steps. With such a hot plate or heating control, it is obvious that the range of heat available is not sufficient to suit all cooking requirements, and the only way such a stove can be successfully used with some cooking vessels, is by placing the vessel only partially over the heating element, the heat of the exposed portion of the element being wasted. Therefore, the chief object of the invention is to develop apparatus for exactly controlling the thermal output of electric heating elements, such as those of electric stoves, glue pots, hot plates and the like, within any predetermined unit of time, such result being accomplished by the operation of the controlling switch in cycles of time "on" to time "off," subject to exact adjustment of time ratio over its operating range. By such method, it is obvious that a heating stove need have only one heating element of maximum B. t. u. capacity, and the use of resistances or other wasteful control methods are entirely avoided. In the preferred operation the heating element is turned to "on" position until it attains its full B. t. u. output, and from that point the current to the heating element is interrupted in repetitive cycles of time "on" to time "off" to maintain the B. t. u. output per unit time at the value found most desirable for the cooking operation being conducted. The result is an electrical heating control which is more flexible and more positive than the control of gas stove burners. It is, of course, to be understood that the operation herein described is entirely distinct from a thermostat control in which the period of operation from "on" to "off" is subject to temperature variations. In the present invention the cycles are varied by time only.

In the present application three types of apparatus will be described and illustrated, it being understood, in this connection, that the electrical switches hereinafter described are to be considered as representative of any type of similar apparatus, and also that the heating element hereinafter referred to, is to be considered as representative of any type of similar apparatus, and that although the operation is described more particularly in relation to cooking stoves, it is to be understood that other uses are within the contemplation of the invention.

Another object of the invention is to produce a construction in which the switch controlling the heating element is combined with signal apparatus, which is illustrated herein as of the visual type, whereby the operator can readily judge of the approximate temperature being evolved by said heating element.

A further object of the invention is to provide cyclic operating mechanism of such nature as to readily lend itself to the use of but one prime mover or source of power, such as an electric motor, for the control of a multiplicity of devices, the individual control of each device being entirely independent of the driving mechanism which may be in operation for the control of the other devices in the same unit.

Another object of the invention is to produce a strong, durable, simple and inexpensive construction of the general character outlined; and in order that it may be fully understood, reference is to be had to the accompanying drawings, in which:

Figure 1 is a side elevation of a mechanism in an intermediate position of adjustment, embodying the invention as it will appear in relation to an electric cooking stove or the like.

Figure 5 is a view of the opposite side of the structure from that shown in Figure 1.

Figure 6 is a diagrammatic view of the device of the invention as it may appear when adapted for controlling a plurality of electric elements, it being understood that the number of elements which may be controlled is limited only by the power of the operating motor as will hereinafter more particularly appear.

Figure 7 is a diagrammatic view of a slightly modified form of control apparatus.

Figure 8 is a side elevation of a modified construction in which the manual control is rotatable rather than slidable as in the previous figures, showing the parts as they will appear when the heat control is at an off position during its cyclic intermittent interruption.

Figure 9 is a rear view of the parts as they appear in Figure 8.

Figure 10 is a side elevation of the parts as they appear when the heat control circuit is just about to be broken during its cyclic operation.

Figure 11 is a similar view of the construction when both the motor and heating circuits are broken or in constantly "off" position.

Figure 12 is a diagrammatic view showing the position of the parts when moved to heater circuit constantly "on," the motor circuit being simultaneously interrupted.

Figure 13 is a rear view of the manual control shaft and its operating cams.

Figure 14 is a fragmentary perspective view of the carrying plate or support and one switch arm.

Figure 1:
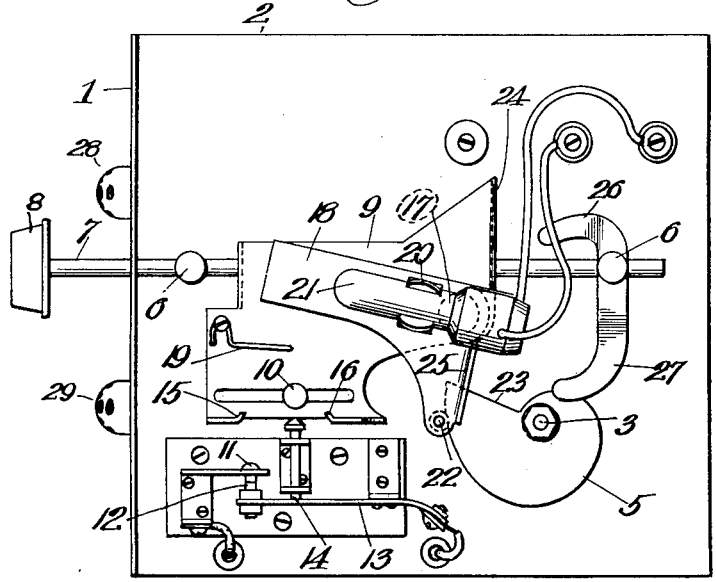
Figure 2:
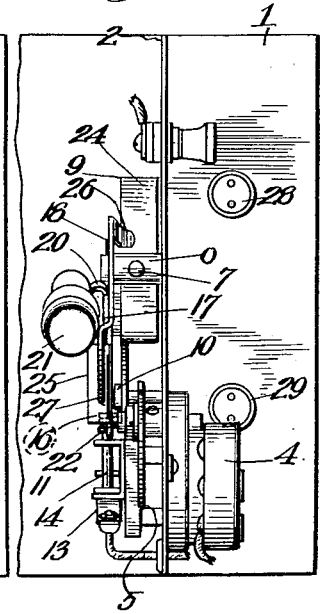
Figure 2 is a rear elevation of the same.
Figure 3:
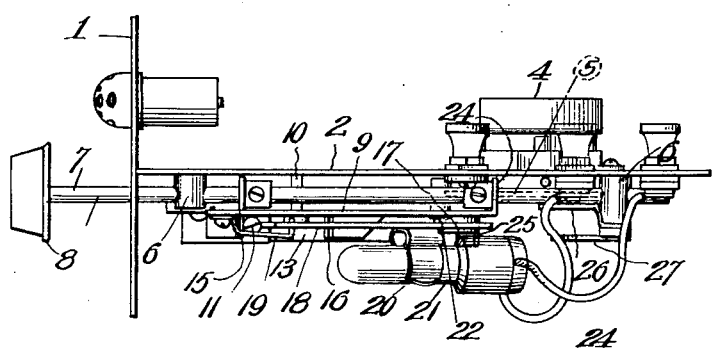
Figure 3 is a top plan view.

In the said drawings, where like reference characters identify corresponding parts in all of the figures, I represents a supporting panel, such as the front of an electrical cooking stove, and in fixed relation thereto is a second panel or supporting-frame member 2. Mounted in suitable relation to the panels is a rotating shaft 3, which may be driven by an electric motor 4, or in any other manner, it being preferable that the motor shall be of constant speed type for heating control, but it may be of adjustable speed type to increase the range of flexible characteristics of the timing control. Keyed or otherwise secured to the shaft 3, in the embodiment shown is a spiral cam or driven member 5, which may be of uniform motion, involute or transitional type, such as an eccentric or otherwise, or may have only a portion of its operating surface of uniform motion characteristics, to cooperate with a cam follower and switch actuating member as will hereinafter appear.

In the representative construction here shown a pair of posts or studs 6 projecting from the panel 2 on the same side as the cam member 5, and mounted in said studs for longitudinal movement, is a rod member 7 which projects through the front panel 1 where it is fitted with an operating handle 8 for manual control of the position of the rod. Rigidly secured to the rod for movement therewith is a plate or support 9, which, in the form shown, is provided with a slot adjacent its lower edge engaged with a headed post 10 carried by the panel 2, to hold the assembly so that the operator cannot accidentally rotate the rod.

Control of the electric motor is through a switch mechanism comprising a pair of contacts 11 and 12. The contact 12 is shown as movable as it is carried by the end of a spring arm 13, said spring arm when unrestrained maintaining the motor circuit closed. The motor switch 11—12 may be opened by pressure applied to resilient arm 13 by a non-conducting pin 14 mounted for sliding movement and being sufficiently light in weight as to impose no appreciable load on the spring arm. The upper end of the pin has a conical or cam-like head against which downward pressure is imposed by a pair of inclined plane or cam surfaces 15 and 16 formed at opposite ends of a pair of flanges bent out of the lower edge of the sliding support or plate 9 carried by the manually shifted rod 7. When the rod is shifted to either end of its limits of travel, the motor circuit is interrupted, but when the rod is in any intermediate position, the motor circuit will be closed, as is clearly apparent from an inspection of Figures 1 and 4.

Carried by the shiftable plate or support 9 or shiftable with the rod 7 in any other manner, is a projecting pin 17 on which an operating arm or member 18 is rockingly mounted, movement of said arm in one direction being arrested by an abutment member 19 carried by the plate 9. The abutment 19 may be resilient as shown, to avoid noise if desired. The arm 18 is so proportioned that when unrestrained, it will always gravitate until its front end contacts the abutment 19, although, of course, it might be arranged to return to its position under the impetus of a spring or weight if the arm should be mounted so that the force of gravity cannot be utilized. In the embodiment of the invention shown, the arm 18 is provided with a spring clip 20 carrying a gravity switch, such as a metal ball within a tube or a mercury or fluid metal switch 21, it being understood that a plurality of switches may be carried by the arm 18 for controlling as many circuits, the switches being normally "open" or "closed" as desired. The switch will be of such size or capacity as to carry the maximum current of any particular electrical apparatus with which it may be in circuit, such as the electric heating elements shown in Figure 6. The details of the switch are not illustrated since they form no part of the present invention, but it is to be understood that all such switches involve a pair of spaced contacts, the circuit being completed through the contacts by a moving body or element. The particular type of switch here shown is one which is "open" when the switch body is substantially horizontal, a rise of about 3° of the small end of the switch with relation to the large end, closing the circuit. However, the exact operating characteristics of the switch are immaterial, as will hereinafter appear, since the cam or driving surface element 5 may be designed to efficiently perform in accordance with the invention with any type of switch. For example, the switch may be of that type which opens the circuit when the switch is in horizontal position. Where exposed contacts are not objectionable, the use of an enclosed switch of the mercury or similar type is not necessary as shown in Figure 7, and as hereinafter more particularly described.

Figure 4:
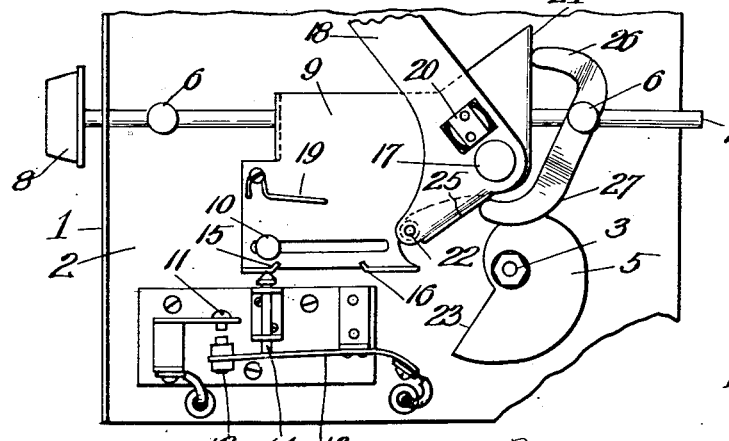
Figure 4 is a fragmentary view of the mechanism shown in Figure 1, with the parts moved to one of their limits of adjustment.

In order to effect timed operation of the element acted upon, or the switch as illustrated herein, the lower end of the operating arm 18 carries a projecting roller-equipped pin 22, which constitutes a cam-follower, and by sliding the rod 7 backwardly and forwardly, this cam-follower may be positioned to initially intercept the path of travel of the spiral cam 5 at an infinite number of points through the length of its operating surface, it being apparent that as the cam is shown as of spiral nature, the manual adjustment of handle 8 is in direct proportion to cyclic switch operation and consequently to the B. t. u. output per unit time of the heating element, in other words, as far as intermittent operation is concerned, one-quarter adjustment of the manual control will equal one-quarter adjustment of cyclic operation; one-half adjustment of the manual control will equal one-half adjustment of cyclic operation, etc. It will be apparent, if proportional heat control is not desired over the entire area of the cam, instead of having its entire operating surface of uniform motion characteristics, any particular portion of its operating area may have such characteristics. If the slide rod assembly is moved to the right in Figure 1, until the cam-follower 22 contacts the cam at its point of shortest radius just far enough to close the mercury switch, it will be evident that rotation of the cam will rock the arm and the switch will be maintained closed as it is moved by the rocking arm riding over the entire length of the cam. The cam-follower 22 will finally ride off the high end of the cam and return by gravity to the point of shortest cam radius, without ever breaking the circuit through the switch. By arranging the parts as shown in Figure 1, whereby the cam surface 23, when horizontal, is in a plane above the horizontal plane of the axis of the cam 5, and the lower portion of the operating surface of the follower or roller 22 is in a horizontal plane below the horizontal plane of the axis of said cam 5, when the arm 18 is in its lowermost position, i. e., in contact with the stop 19, said rocking arm 18 will return to normal position without abrupt dropping or instantaneous action as the roller or follower 22 will roll down the back-side of the cam 23 between high and low radii, since the cam rotates slowly and the arm will move downward only as permitted by cam rotation. From this point of continuously "on," the rod 7 may be manipulated to withdraw the assembly so that initial contact of the follower 22 with the cam shall be at any desired point, giving infinite adjustment, through the length of the operating surface of the cam, until finally the follower is entirely beyond the path of the cam, at which time the motor circuit through the switch 11—12 will be interrupted by member 16, as heretofore mentioned, the cam operating roller pin 22 being lifted beyond the path of travel of the highest point on the cam 5, and the circuit through the motor being simultaneously broken by operation of switch 11—12 by member 15, as heretofore mentioned. The mechanism for accomplishing the result outlined is, as follows: The rear end of the supporting plate 9 is provided with a flange 24, and the rear end of the rocking arm 18 is also provided with a flange 25. Rockingly mounted on the panel 2 in any suitable way, in the present embodiment being shown as rocking from the end of the rearmost stud 6, is a lever member having a short arm 26 above its pivotal point, and a long arm 27, below its pivotal point, said arm normally standing in the position shown in Figure 1. When the rod 7 is pushed inwardly to its full limit of travel, the short arm 26 is struck by the flange 24 on the plate 9, and the lever immediately commences to swing until its lower end 27 contacts the flange 25 of the rocking arm 18 at a point below the horizontal plane of its center of rocking movement. Continued movement of the rod 7 causes swinging of the rocking arm 18 to the position shown in Figure 4, at which time the roller pin 22 is beyond the path of travel of the highest point of the cam 5. The parts are so proportioned, that the weight of the rocking arm 18 and its assembly is insufficient to overcome the resistance of the slide rod 7 and its assembly, consequently the parts remain in the position described, until the operator manually pulls the rod out or to the left, as shown in Figures 1 and 4.

The type of operating mechanism described particularly lends itself to operation in multiple units as shown diagrammatically in Figure 6, where there is a single motor or drive shaft equipped with a plurality of timing controls involving the invention, all of the individual units being controllable entirely independently of the positions of the other units or controls of the group. In the diagrammatic view, the energized elements and the motor circuit are shown as being supplied with current from independent power lines, instead of being fed by the same line as in the other figures. The following table indicates the relationship of the various parts of the apparatus shown in Figure 6:

|  | Fully off | Cyclic operation | Continuously on |
| --- | --- | --- | --- |
| Manual slide | Pulled out | Intermediate position | Pushed in. |
| Motor circuit | Broken by member 16 | Closed at 11—12 | Broken by member 15. |
| Cyclic circuit | Broken, switch horizontal | Switch being actuated | Closed, switch beyond cam travel. | tioned. It will thus be apparent that the distance the arm 18 moves, in other words, the length of its path of travel and consequently the time the cyclic switch is closed as compared to the speed of movement of the cam 5, is subject to infinite adjustment.

In view of the fact, however, that at times it may be desired to have the mercury or cam operated switch continuously "on" without the wear incident to cam operation such as above described, and to avoid unnecessary motor operation, although this is a minor objection if the motor draws but little current, the embodiment of the invention shown in Figures 1 to 5 inclusive, is provided with mechanism, whereby the small end of the mercury switch can be moved upwardly slightly beyond the maximum lift of cam-arm operation, and held permanently in this position.

As indicated structurally in Figures 1 to 5 inclusive, and as shown diagrammatically in Figure 6, the electrical circuits may be provided with suitable tell-tale lights as visual signals or indications of current conditions. Depending upon the carrying characteristics of the lights, each of the operating circuits may have its light in parallel or series. Usually the lights will be connected in parallel as indicated in Figure 6, in which each heating element has a tell-tale light 28 and the motor is provided with its own tell-tale light 29, the motor control circuit being subject to the control of any of the slide-operated switches by connecting them in parallel as shown, the heating element circuits also being independent of each other by connecting their mercury or cyclic switches in parallel as illustrated. In practice, each of the heating tell-tale lights will preferably be placed closely adjacent the particular manual control to which it relates and will be differently colored from the motor tell-tale which may be centrally located, for example, red may be used for the tell-tale cyclic circuits and green for the motor circuit. Of course, the control rod for operation of the cyclic circuit may be calibrated in heat units or other visual indications, but it is probable that under average conditions, the operator of the control will soon acquire such familiarity with the flashing period of the red tell-tale lights as to be a good judge of the approximate heat being developed by any particular heating element.

In Figure 7, a modified construction is shown for use where open contacts are not objectionable. In this construction there is a driven element or cam 30, and rockingly mounted for continuous translation by the cam, is a lever or operating arm 31, which is moved through a repetitive path of unvarying length. The arm 31 carries a contact 32 forming one pole of a control switch. Pivotally mounted above the first arm is a second arm 33, having a contact 34 constituting the other arm of the control switch. This second arm may be moved toward and from the first arm under the action of a manually adjusted cam lever 35. The arm 33 may be weighted or have a spring to constantly maintain its contact end down or toward the arm 31, as limited by the adjustment of the manual cam 35. Thus the time of closing the circuit may be controlled by regulation of the time of initial contact of the two poles or switch points, the cam driven arm 31 after having contacted the manually adjusted arm 33, maintaining the circuit constantly closed and the switch as a whole being translated through a path of adjustable length as heretofore referred to. The ultimate result of the operation is the same as previously described.

In the modified construction shown on Sheet 3 of the drawings, which illustrate one form of rotating manual control in place of the longitudinally adjustable control of the previous figures, 36 is a suitable panel which forms a part of a stove or the like, and mounted on said panel is a motor 37 having a shaft 38. Secured to said shaft to turn therewith, is one or more cams 39. These cams need not be spiral, since, as will hereinafter appear, spiral cams, or cams having at least a portion of their circumference of increasing radii, are used to position the switch toward and from the driven cam.

Projecting from the panel 36 are a pair of posts or studs 40 in which a manually rotatable shaft 41 is journaled. In the embodiment shown, the panel 36 also carries a second stud or journal pin 42, and independently journaled on said pin are a pair of switch arms 43 and 44, the former underlying the latter and each being equipped with circuit closing contacts 45, which are insulated from the arms by insulation disks 46. These contacts are connected by suitable conductors 46a to a heater element as described above. The lower switch arm 43 carries a non-conducting cam-follower block 47 which is adapted to ride on the constantly driven cam 39. It will be apparent from an inspection of Figure 8, that as the lower arm 44 is elevated by the cam 39, the contacts 45 are brought together by the raising of said arm 43, continued rotation of the cam causing arm 43 to elevate arm 44, both arms swinging upwardly on the pin 42, the contacts 45 being held in closed position during such travel.

In order to position the switch 43—44 in relation to the driven cam 39, a third arm or supporting plate 48 in independently journaled on the pin 42, the position of said support 48 being controlled by a spiral cam 49, or at least a portion of its working surface is of increasing radii, which is keyed or otherwise secured to the manually adjusted shaft 41. The third rocking plate or support 48 has a projecting flange 50 which constitutes a follower for riding on the manually positioned cam 49. For properly controlling the switch arms, the plate 48 has a pair of stops 51 and 51a, which respectively limit downward movement of the switch arms 43 and 44, the stops being so spaced that when the arms are in contact with their respective stops, the contacts 45 are spaced apart and the circuit through the heater element is interrupted. In order to insure that the plate 48 rides the cam 49, and that the arms 43 and 44 will always return into contact with their respective stops 51 and 51a, suitable hold-down springs 52, 53 and 54, may respectively connect the plate 48 to a fixed part of the stove, such as to the front stud 40, and the arms 43 and 44 to the positioning plate 48, it being understood, as will hereinafter appear, that the tension of the spring 52 must exceed the combined tension of the other two springs 53 and 54.

Also keyed to the manual control shaft 41 is a second cam 55, which is positioned to abut the heel 56 of the lower arm 43, whereby the lower arm can be elevated independently of the position of the plate 48, to close the contacts 45 and raise the upper arm 44 through the pressure applied through said contacts as shown in Figure 12. In this position of the parts, the heater circuit is constantly "on" or closed, the cam follower 47 being elevated above the maximum radius of the cam 39.

When it is desired to turn to constantly "off" to place the heater control beyound the range of movement of the driven cam 39, the front cam 49 is rotated to elevate the plate 48, which, through 51 and 51a, respectively, raises the switch arms out of the path of cam travel. During this movement the contact points 45 remain in spaced or open circuit position, as shown in Figure 11.

In order to secure coactive operation of the motor circuit, the shaft 41 may have a third cam or motor circuit control cam 57, whereby when the heating circuit is turned to constantly "on" or "off," the motor circuit may be broken, or if the motor requires but a small amount of current and its wear and tear is not of moment, the motor circuit may be left in closed position when the heating circuit is continuously "on" by shifting the cam from its full to dotted line positions in Figure 13. The relative positions of the cams on the manual control shaft, as viewed from the rear, is shown in Figure 12. To cooperate with the cam 57 an insulating block 58 is carried by the panel 36, and mounted on said block are a pair of contact arms 59 and 60, respectively connected to the opposite terminals of a motor 37. The arm 60 is of resilient nature, and its free end constitutes a follower in constant contact with the cam 57.

From the above it will be evident that we have produced a construction embodying the features of advantage pointed out as desirable, together with others which will be recognized by those skilled in the art, and although we have described and illustrated the preferred constructions, it is to be understood that we reserve the right to such changes as fall within the spirit of the invention and without the ambit of the prior art.

We claim:

1. In combination, a pair of electric circuits, comprising a motor circuit and a heating circuit, a motor in the motor circuit, a switch controlling the motor circuit, a heating element in the heating circuit, a switch controlling the heating circuit, driven means actuated by the motor for variable intermittent cycling of the heating switch between open and closed circuit positions, and manually operable means for effecting actuation of the motor switch and for varying the ratio of closed to open circuit cycling of the heating switch by the driven means.

2. In combination, a pair of electric circuits, comprising a motor circuit and a heating circuit, a motor in the motor circuit, a switch controlling the motor circuit, a heating element in the heating circuit, a switch controlling the heating circuit, driven means actuated by the motor for variable intermittent cycling of the heating switch between open and closed circuit positions, and manually operable reciprocating means for actuating the motor switch and for varying the ratio of closed to open circuit cycling of the heating switch by the driven means.

3. In combination, a pair of electric circuits, comprising a motor circuit and a heating circuit, a motor in the motor circuit, a switch controlling the motor circuit, a heating element in the heating circuit, a switch controlling the heating circuit, driven means actuated by the motor for variable intermittent cycling of the heating switch between open and closed circuit positions, and manually rotatable means for actuating the motor switch and for varying the ratio of closed to open circuit cycling of the heating switch by the driven means.

4. In combination, a pair of electric circuits, comprising a motor circuit and a heating circuit, a motor in the motor circuit, a switch controlling the motor circuit, a heating element in the heating circuit, a switch controlling the heating circuit, driven means actuated by the motor for variable intermittent cycling of the heating switch between open and closed circuit positions, a manually rotatable shaft, a cam on said shaft for controlling the motor switch, and a second cam on said shaft for varying the ratio of closed to open circuit cycling of the heating switch by said driven element.

5. In combination a pair of electric circuits, comprising a motor circuit, and a heating circuit, a motor in the motor circuit, a switch controlling the motor circuit, a heating element in the heating circuit, a switch controlling the heating circuit, a cam driven by the motor for variable intermittent cycling of the heating switch between open and closed positions, and manually operable means for effecting actuation of the motor switch and for varying the ratio of closed to open circuit cycling of the heating switch by the motor driven cam.

6. In combination, an electric stove having a motor circuit and a plurality of heating circuits, a plurality of parallel-connected switches in the motor circuit for independent control of said circuit, a heating element in each heating circuit, a switch controlling each heating circuit, means simultaneously actuated by the motor for independent variable intermittent cycling of the heating switches between closed and opened positions, and manually adjustable means for each heating switch whereby said heating switches can be positioned to continuously "on" or continuously "off," independently of the operation of its intermittent actuating means, said manually adjustable means simultaneously opening a determined motor switch on moving its companion heating switch to continuously "on" or "off."

7. In combination, an electric stove having a motor circuit and a plurality of heating circuits, a plurality of parallel-connected switches in the motor circuit for independent control of said circuit, a heating element in each heating circuit, a switch controlling each heating circuit, means simultaneously actuated by the motor for independent variable intermittent cycling of the heating switches between closed and opened positions, and manually adjustable means for each heating switch whereby said heating switches can be positioned to continuously "on" or continuously "off," independently of the operation of its intermittent actuating means, said manually adjustable means simultaneously opening a determined motor switch on moving its companion heating switch to continuously "off."

PAUL H. BROWN.
RUSSELL M. CARSON.